Figure 1:
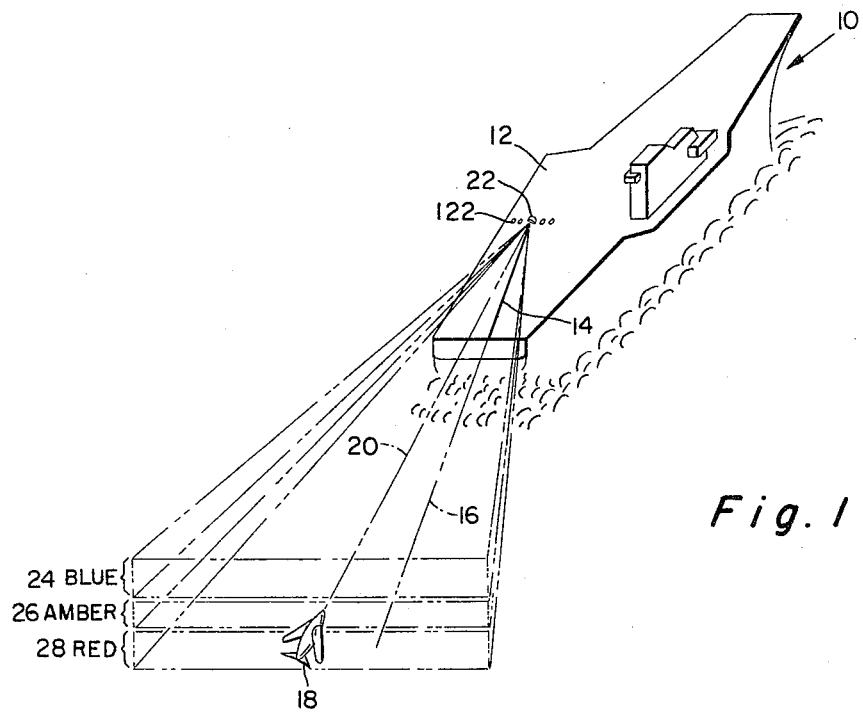

Oct. 18, 1966 C. J. RICKETTS ETAL 3,279,406
GLIDE PATH INDICATOR SYSTEM
Filed Jan. 14, 1965 2 Sheets-Sheet 1

INVENTORS
COLIN J. RICKETTS
ANDREW J. BODNAR
FREDERICK T. BRAITHWAITE
SEWARD R. JOHNSON
ERNEST E. WHEELER

United States Patent Office 3,279,406
Patented Oct. 18, 1966

3,279,406
GLIDE PATH INDICATOR SYSTEM
Colin J. Ricketts, Bureau of Naval Weapons-RSSH, Washington, D.C.; Andrew J. Bodnar, Bureau of Naval Weapons-RSSH-4, Washington, D.C.; Frederick T. Braithwaite, 2055 Eucalyptus, San Carlos, Calif.; Seward R. Johnson, 7996 El Capitan Drive, La Mesa, Calif.; and Ernest E. Wheeler, 1140 Downing, Imperial Beach, Calif.
Filed Jan. 14, 1965, Ser. No. 425,639
3 Claims. (Cl. 114—43.5)

The invention described herein may be manufactured and used by or for the Government of the United States of America for governmental purposes without the payment of any royalties thereon or therefor.

The present invention relates to an optical indicating device, and more particularly to apparatus for visually presenting the pilot of an aircraft information respecting the proper approach angle for the safe landing of his craft on an area of limited size.

Under ordinary circumstances, very little difficulty is experienced by aircraft pilots in landing their craft on the usual commercial or military airfield, since the length of the runways is adequate to meet the requirements of any particular aircraft to which landing clearance has been granted. However, the same is not necessarily true of mobile landing platforms or decks such as are found on Naval aircraft carriers, such decks rarely exceeding 900 feet in length. In spite of the presence of resilient arresting cables which are designed to intercept and rapidly decelerate an aircraft following touchdown, it is extremely important that the entire landing operation proceed according to a prescribed pattern as otherwise damage to the aircraft and/or injury to the pilot is likely to occur.

One of the earliest methods by means of which the pilot could be guided toward a safe landing on an aircraft carrier made use of the services of an indivadual designated as the Landing Signal Officer, whose duties were to convey visual information to the pilot of an approaching aircraft with respect to the latter's position. During landing operations, this individual was stationed to one side of the runway, and signaled the pilot by means of paddles held in each hand. Ideally, the Landing Signal Officer perceived small but important errors in the aircraft's position, and instructed the pilot to make the necessary corrections therefor. This procedure is still employed under favorable conditions, but obviously its effectiveness depends upon many factors, such as the skill of the Landing Signal Officer, the experience of the pilot, and the state of the weather at the time. In addition, the extremely high landing speeds of jet aircraft materially reduce the available time during which signals may be given, so that the pilot is in many cases incapable of making the necessary positional corrections before the aircraft has reached the landing surface.

The above-mentioned limitations in the manual guidance process have been recognized, and a number of expedients have been proposed to overcome these drawbacks. One suggestion has involved the provision of a mirror system the object of which is to develop a so-called "meatball" located to one side of the runway and acting to present to the pilot of the approaching aircraft the image of a fixed light source the position of which is indicative of the elevational status of the approaching aircraft with respect to the proper glide path. To bring this about, a reference line is established (usually by a series of lamps arranged in a horizontal row) and with the positional light image coinciding therewith when the aircraft is proceeding on a correct approach path. However, when the approach angle is excessive, the positional light image will lie above the row of reference lamps, and, similarly, if the angle of approach is too small, the positional light image will be below the reference line. Only with a correct approach angle will the positional light image and the reference line substantially coincide in a vertical sense.

Although devices of this type are in extensive use and operate in a generally satisfactory manner, they nevertheless possess certain characteristics which divert the pilot's attention at a time when he is occupied with the details of the landing itself. For example, the so-called "meatball" devices now in operation must of necessity be located to one side of the landing area or runway in order to be out of the path of the aircraft. Consequently, the pilot must divide his attention between this visual indicator, the surface of the landing area, and the various dials on his instrument panel. It has proven to be somewhat disconcerting for the pilot to attempt to concenrate on so many items within the extremely short time available to complete the landing successfully. Another feature of present systems which occasionally results in the conveying of erroneous information to the pilot is that an aircraft carrier is subject to a considerable amount of pitching motion, especially in a rough sea, and this pitching of the vessel causes the light image of the "meatball" to move through a discernible angle. Ordinarily this is not serious, but, when visibility is impaired, the aircraft pilot may misinterpret the actual location of the flight deck with possible serious consequences.

According to a feature of the present invention, a glide path indicating device is provided which allows the aircraft pilot to focus his attention directly on the landing area without being required to shift his vision to one side in order to observe a positional indicator. This is brought about, in a preferred embodiment of the invention, by locating the indicating device along the center line of the flight deck and in the path which the aircraft will follow in landing. The indicator structure is placed almost entirely below the landing surface so that only the light projecting portion thereof extends thereabove. The pilot accordingly can align this indicator with his intended approach pattern and successfully complete the landing by maintaining the indicator light centered directly ahead. An additional advantage incorporated into the indicator of the present invention is the provision of stabilizing the indicator against any pitching motion which the vessel may be undergoing at the time the landing is carried out. This prevents the pilot from obtaining a possibly erroneous impression as to the location of the proper guide path, and hence cause the aircraft to "come in" at either too small an angle which would result in its overshooting the landing area, or at an angle which is too great so as to produce an excessive impact on the surface of the flight deck. A still further advantage possessed by the invention device is that the various indications presented to the aircraft pilot are assigned different chromatic characteristics, so that the pilot need only maintain his craft in a zone delineated by the correct color boundaries in order to be certain that he is approcahing the landing area along a proper path. If he is too high or too low, this fact will be brought forcibly to his attention by the chromatic nature of the light received during the time period he is within such an incorrect region.

One object of the present invention, therefore, is to provide improved apparatus for facilitating the landing of an aircraft on an area of limited size, such, for example, as the flight deck of a carrier.

Another object of the invention is to provide an aircraft landing device especially designed for use on an aircraft carrier, such device incorporating means for preventing erroneous information as to the position of the aircraft from being conveyed to the aircraft pilot when the vessel is being subjected to pitching and/or rolling as a result of wave motion.

An additional object of the invention is to provide an aircraft landing system in which information as the position of an approaching aircraft is conveyed to the pilot thereof by an indicator located directly ahead and on the centerline of the landing area, so that the indicator is coordinated with the approach pattern and can be observed by the pilot without requiring his attention to be diverted from the landing surface.

A still further object of the invention is to provide a system whereby a pilot may land an aircraft on an area of limited size and under conditions of impaired visibility by projecting toward such aircraft a plurality of zones of illumination, each such zone having a chromatic characteristic different from that of the remaining zones and with the chromatic characteristic of each zone being indicative of the location of such zone with respect to a predetermined glide path which the aircraft should ideally follow in effecting a safe landing.

Figure 3:
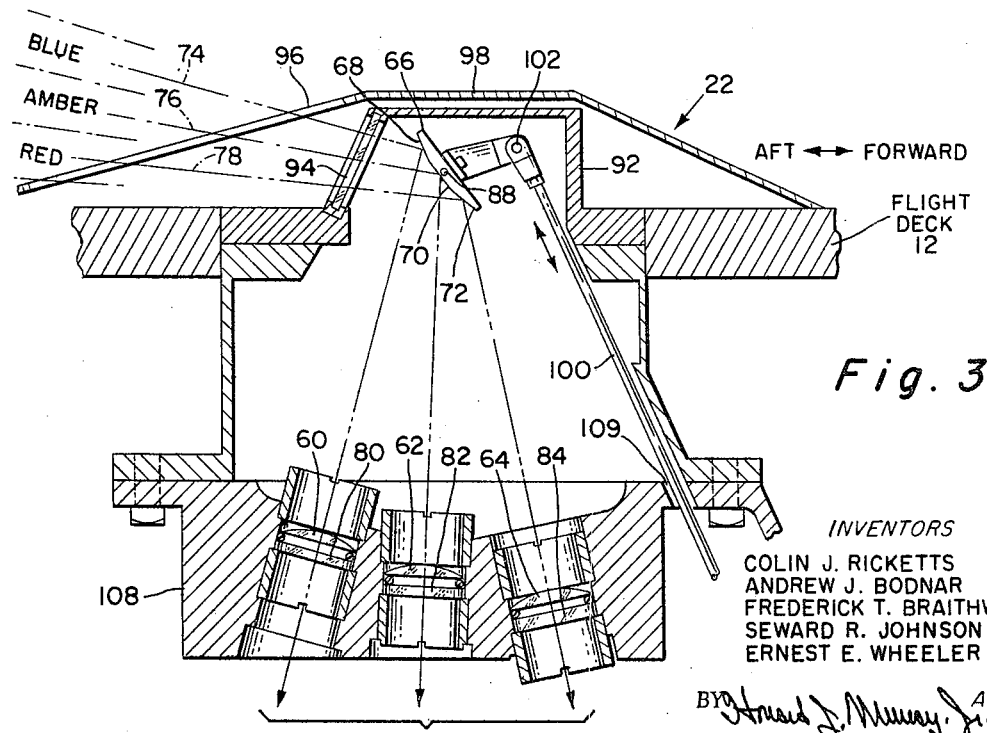
Figure 2:
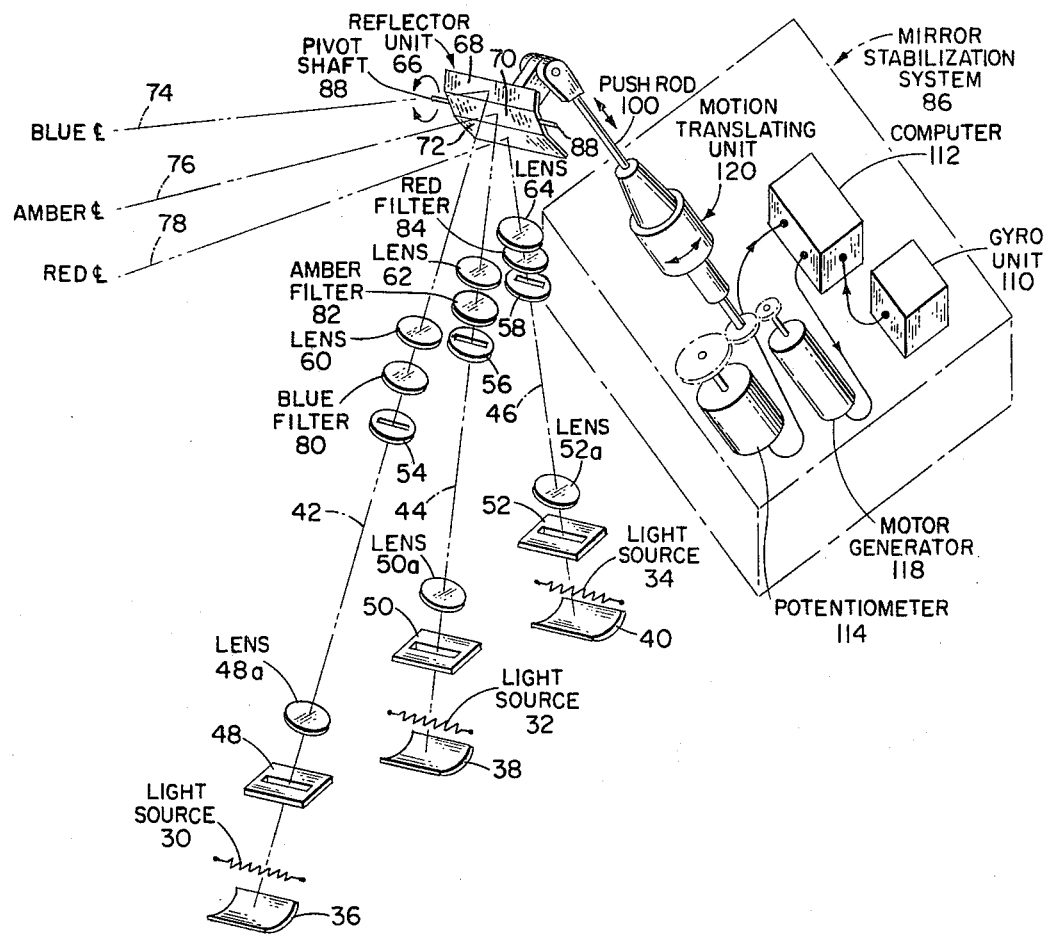

Other objects, advantages, and novel features of the invention will become apparent from the following detailed description of the invention when considered in conjunction with the accompanying drawings, wherein:

FIG. 1 is a perspective view of an aircraft carrier having an angled landing area or flight deck, and also showing an aircraft approaching such landing area;

FIG. 2 is a schematic presentation of an indicating apparatus designed to be carried by the aircraft carrier of FIG. 1 and to be located on the flight deck of such carrier along the centerline thereof; and FIG. 3 is a cross-sectional view of one portion of the indicating apparatus of FIG. 2 which is located along the surface of the flight deck of the aircraft carrier shown in FIG. 1, illustrating the relationship between such flight deck and a light-reflecting member which is stabilized against movement of the vessel due to wave motion.

Referring now to the drawings, there is shown in FIG. 1 an environment of the kind wherein the present concept finds particular utility. As shown, an aircraft carrier, identified by the reference numeral 10, is designed with a relatively short landing area in the form of an angled flight deck 12. The centerline of the flight deck 12 is commonly provided with a visible marking 14, and for descriptive purposes such centerline is assumed to extend aft of the vessel, as illustrated by the broken line 16.

An aircraft 18 is shown as approaching the flight deck 12 of the carrier 10 for a landing. The normal pattern followed by the aircraft 18 is along a curved path in azimuth before turning into alignment with a vertical plane containing the centerline marking 14 (and its projection 16). Accordingly, it is desirable to present to the aircraft pilot, especially under conditions of impaired visibility, a display that is discernible over a fairly wide azimuthal range to allow the pilot sufficient time to accurately position his craft along the proper glide path for an approach to the deck 12. For the purpose of the present invention, it will be assumed that the correct path for the aircraft 18 to follow in effecting a safe landing is that designated in the drawing by the reference numeral 20, this path 20 forming an angle of approximately 3½ to 4 degrees with respect to the flight deck centerline marker 14 and its projected extension 16. Although this glide path is, of course, not linear, it may be represented by the line-of-sight of the pilot when his vision is centered on an indicating device positioned on the flight deck 12 and identified in FIG. 1 by the reference numeral 22. This indicator 22, to be more fully described in connection with FIGS. 2 and 3 of the drawings, lies along the flight deck centerline 14 and intermediate the respective flight deck overhangs.

According to a feature of the present invention, the light output of the indicator 22 of FIG. 1 forms three zones which are distinguishable from one another by their particular chromatic characteristics. These three zones are established by light emanating in the region of the indicator 22 and diverging outwardly toward the aircraft 18. As illustrated, these three zones of illustration (represented by the reference numerals 24, 26 and 28 respectively) are in the form of substantially continuous bands displaced from one another in elevation. The center zone or band 26 embraces therewithin the pilot's line-of-sight 20 to the landing area, and hence represents the correct positioning of the aircraft 18 in order that it follow a predetermined path toward the flight deck 12. To convey to the aircraft pilot that his approach pattern is correct when he is within the zone 26, the illumination within this zone is accorded a particular color, such, for example, as amber. However, if the aircraft 18 is approaching the landing area at too great an angle, so as to incur the possibility of an excessive impact on the flight deck, then this fact will be communicated to the pilot by virtue of his receiving illumination having a different color characteristic, in this case the color (for example, blue) of the light of which the zone 24 is constituted. At the other extreme is the situation in which the aircraft is approaching the landing area 12 at too small an angle so that the risk of overshooting the landing area is present. However, in such a situation, reception by the pilot of light of a still different particular color (red) should inform him that he is within the zone 28 and hence should increase his altitude to enter zone 26.

In FIGS. 2 and 3 of the drawing is set forth a more detailed showing of the indicator unit 22 of FIG. 1. In FIGURE 2 there is illustrated schematically an assembly for developing the various-colored zones 24, 26 and 28 of FIG. 1, this assembly including three independent light sources which may be of any suitable type but which are exemplified by the respective lamp filaments 30, 32 and 34. These light sources are intended to be located below the surface of the flight deck 12 of the carrier 10 in a manner which will become more apparent during a discussion of FIG. 3. At the present point, it is only necessary to recognize that the light developed by energization of the respective filaments 30, 32 and 34, is directed by associated reflectors 36, 38 and 40 along the optical paths 42, 44 and 46, these light paths converging in a generally upward direction toward the surface of the deck. In order to limit the light output of the respective sources to beams of generally rectangular cross-section, a plurality of masks 48, 50 and 52 are interposed in the respective light paths, each mask having a rectangular cutout portion through which illumination developed by respective filaments can pass. To further concentrate the light rays following the paths 42, 44, and 46 into beams of rectangular cross-section, a plurality of meniscus lenses 48a, 50a and 52a are utilized, one such lens being associated with each of the masks 48, 50 and 52.

For reasons which will hereinafter appear, it is essential that the light rays following the paths 42, 44 and 46 define beams of precisely rectangular cross-section. To aid in establishing such a condition, the light rays in each of the mentioned paths pass through a still further mask 54, 56 or 58 and then through a second lens of the plano-convex type, such lenses being respectively identified by the reference numerals 60, 62 and 64. Consequently, the light rays as they emerge from the plano-convex lenses will be in the form of sharply-defined beams of relatively high intensity.

In connection with the preceding description, it should be understood that the optical axis of each of the three light beams following the paths 42, 44 and 46 lies in a plane which also includes the centerline 14 of the aircraft landing area 12, and, furthermore, that this plane which encompasses the respective light paths 42, 44 and 46 lies essentially normal to the surface of such aircraft landing area. This relationship will be more clearly appreciated when a description of FIG. 3 is presented. At this point, however, it need only be recognized that, within the mentioned plane, the three light paths 42, 44 and 46 converge toward a multiple-surfaced reflecting unit generally identified in FIGURE 2 by the reference numeral 66.

The function of this reflecting unit 66 is to receive on the respective surfaces thereof the three light beams following the paths 42, 44 and 46 and to reflect such beams in a direction generally aft of the carrier vessel. In order to achieve this result, the reflective unit 66 is made up of three planar surfaces which are angularly disposed with respect to one another in a manner best brought out by FIG. 2. In addition, each of these planar surfaces 68, 70 and 72 is in the shape of a rectangle the boundaries of which generally coincide with the boundaries of the light beam which is intended to impinge thereon. As a consequence, the beam following the path 42 is reflected from the surface 68 to follow a new path indicated in FIG. 2 by the reference numeral 74. The beam following path 44 is similarly reflected from surface 70 to follow a different path 76, while surface 72 reflects the incident beam 46 toward a new path 78. It will be noted from FIGS. 2 and 3 that although the incident beams 42, 44 and 46 converge toward the reflector unit 46, nevertheless the emergent beams 74, 76 and 78 diverge in an aft direction toward the approaching aircraft 18 of FIG. 1, and constitute the zones of illumination 24, 26 and 28 discussed in connection with the foregoing description. It should be understood that the reference numerals 74, 76 and 78 in FIG. 2 only designate the center lines, or optical axes, of the three beams, and that in actuality they are of a width such as brought out in FIG. 1 where the zones illuminated thereby are illustrated.

It has been mentioned in connection with a description of FIG. 1 that the light in each of the three zones 24, 26 and 28 possesses a different chromatic characteristic. In order to impart this particular aspect to the light visible to the pilot of the aircraft 18, a plurality of filters 80, 82 and 84 are respectively interposed in the paths 42, 44 and 46, each of these filters passing therethrough light of one particular color. For example, the filter 80 allows only blue light to pass, the filter 82 allows only amber light to emerge, while the filter 82 transmits only red colored light. This results in the development of the three colored zones 24, 26 and 28 of FIG. 1.

It has been mentioned above that unless some means is provided to compensate for pitching of the vessel 10 due to wave motion, the colored zones 24, 26 and 28 will change their position with each such ship movement, and consequently the pilot of aircraft 18 is liable to receive confusing information as to the actual location of the flight deck on which he is to land his craft. The present invention incorporates means for stabilizing the signal-developing unit against such ship motion, this stabilizing means comprising an assembly somewhat schematically illustrated in FIG. 2 and generally designated by the reference numeral 86. Although the details of this stabilization apparatus 86 forms no part of the present invention, nevertheless the basic operating characteristics thereof will be set forth below in order to present an understanding of its function in the invention system. Before proceeding with this portion of the description, however, it should be mentioned that the reflector unit 66 is mounted for limited angular rotation about a horizontal axis, or, more accurately, about an axis which lies parallel to the surface of the deck 12 and normal to the center line 14. This is perhaps best shown in FIG. 3, where the relationship between the reflector unit and the surface of the flight deck 12 is set forth. The reflector assembly 66 is mounted on a pair of pins 88 (FIG. 2) which acts as pivot shafts, the latter being receivable in some stationary bearings (not shown) positioned by the reflector housing or turret 90. However, it is only essential to recognize that the reflector unit 66 is free to rotate about this axis defined by the pins 88 through a limited angle in either direction, so that the reflecting surfaces 68, 70 and 72 may be subjected to a displacement with respect to the flight deck 12 upon operation of the stabilizing apparatus 86 referred to above. Before providing a brief description of the manner in which this relative movement is brought about, the structural details of the reflector assembly 66 as illustrated in FIGS. 2 and 3 will be set forth.

The relationship between the indicator apparatus of FIG. 2 and the flight deck 12 of the aircraft carrier 10 is brought out by FIG. 3. As shown therein, the deck 12 has therein an opening designed to receive the upper portion of the turret 90 within which the reflector unit 66 is housed. As brought out in the drawing, a major portion of the apparatus of FIG. 2 is so located as to be below the flight deck 12, with only the three-sided reflector element per se extending thereabove. This reflector element is pivoted so as to rotate about the shafts 88, the latter being supported by that part 92 of the turret which extends above the flght deck surface. The turret portion 92 being of substantially box-like configuration. The three-sided reflecting element is so positioned that light rays from the respective sources 30, 32 and 34 are reflected thereby in an aft direction, passing through an apertured section 94 of the turret portion 92 and then through the transparent portion 96 of a rigid cover member 98 which overlies the turret portion 92 and is designed to protect the latter from contact with the wheels of a landing aircraft. The cover 98 is so configured that no damage will result to any aircraft which might land in such a position as to pass over the turret portion 92.

The reflector unit 66 is caused to rotate through a limited angle about the axis defined by the pivot shafts 88 in response to an axial displacement of a push rod 100 one end of which is pivotally attached at 102 to a lever 104 the opposite end of which is securely affixed to the back surface of the three-surfaced reflector 66. Consequently, upon motion of the push rod 100 in either direction (as shown by the arrows) the reflector unit 66 will be displaced relative to the flight deck 12. If the latter is unstable because of wave motion affecting the vessel 10, then movement of the push rod 100, by maintaining the light paths 74, 76 and 78 at a constant angle with respect to the horizontal, can similarly maintain correct the indication furnished the pilot of the aircraft 18 during a landing operation.

Secured to the lower portion of the turret 90 is a lens block 108 which rigidly supports therein the three plano-convex lenses 60, 62 and 64 of FIG. 2, as well as the three colored filters 80, 82 and 84. The lens block 108 is securely bolted or otherwise affixed to the turret 90 so that no displacement therebetween can occur. The lens block 108 contains an opening 109 through which the push rod 100 passes. Below the lens block 108 is a further structure which positions the light sources 30, 32 and 34 of FIG. 2 together with their associated reflectors, masks, and meniscus lenses, but this supporting structure may be of an entirely conventional nature and hence been omitted from the drawing in the interest of simplicity.

The stabilization system 86 of FIG. 2 has been stated to be of a known type and to form no part of applicants' invention. However, in order to more clearly bring out the function of this stabilizing apparatus, it might be mentioned that it includes a gyro unit 110 which is intended to develop an output signal representative of departures of the flight deck 12 of vessel 10 from a level condition. Such gyros are well known in the art. The output of the gyro is applied to a computing device 112 which also receives an electrical signal from a potentiometer 114 geared to a rotatable shaft 116 disposed coaxially with the push rod 100. The output of potentiometer 114 is consequently representative of the instantaneous angular position of the shaft 116.

Computer 112 is arranged to generate an output voltage representative of any deviation of the vessel 10 from a stable condition. This output signal from the computer 112 is supplied to a motor generator 118 which is geared as shown to drive the shaft 116. As a consequence, the latter will assume an angular position dependent upon the instantaneous angle that the flight deck of the vessel 10 makes with the horizontal. This angular movement of the shaft 116 is converted into an axial movement of the push rod 100 by means of a motion-translating unit 120 which may be of any suitable type known in the art, such, for example, as a ball-screw arrangement.

When the deck 12 of the vessel 10 changes its orientation due to wave motion, the gyro unit 110 will generate a voltage output which is processed by the computer 112 in conjunction with the signal output of potentiometer 114 to thereby vary the angular position of shart 116 and hence the axial position of push rod 100. This will cause the three-sided reflector unit 66 to pivot about the axis of shafts 88 and hence maintain the direction in which the respective colored beams 74, 76 and 78 are transmitted to the general region of the approaching aircraft. Thus the aircraft pilot is provided with correct information regardless of weather conditions that might otherwise produce misleading information and adversely affect the landing operation.

To provide the pilot of aircraft 18 with a horizontal or transverse reference line associated with the indicator unit 22 of FIG. 1, two sets of datum lights, identified by the reference numeral 122, are aligned to either side of the indicator 22 as illustrated in the drawing. The three lights in each set are preferably strobed toward the centerline 14 of the landing area 12 so as to be clearly visible to the aircraft pilot.

While certain colors have been indicated as being preferable for the beams 74, 76 and 78, others may be substituted therefor. For example, the blue beam may be of green color if such is deemed preferable by the aircraft pilots.

Obviously many modifications and variations of the present invention are possible in the light of the above teachings. It is therefore to be understood that within the scope of the appended claims the invention may be practiced otherwise than as specifically described.

We claim:

1. In an optical system for aiding a pilot to fly his craft along a prescribed glide path toward a landing on the flight deck of an aircraft carrier, such flight deck having a centerline along which the said optical device is located, the combination of:

three spaced-apart light sources each of which is designed to generate a light beam;

means for directing the light beams so generated in a generally upward direction toward the flight deck of said carrier, the respective paths of said beams converging toward one another so that they arrive in the region of said flight deck in a contiguous relationship;

three masking means, one of which is associated with each of the said light beams so as to confine such beam to one of generally rectangular cross-section;

three filters respectively associated with said beams so as to impart to each beam a chromatic characteristic which is different from the characteristic imparted to each of the remaining beams;

a multiple-surfaced reflecting unit located in the general plane of said flight deck and in the path of the three light beams which converge in the general region thereof, said reflecting unit being made up of three planar reflecting surfaces angularly disposed with respect to one another, and with each of such surfaces being contiguous to at least one of the remaining surfaces;

the three planar surfaces of said unit lying in planes which are each normal to a vertical plane passing through the centerline of said flight deck;

said reflecting unit being mounted for limited angular rotation about an axis which is parallel to the surface of said flight deck and normal to the said vertical plane which includes the said flight deck centerline, the said axis of rotation of said reflector unit also lying in the plane of one of the said planar reflecting surfaces and parallel to each line of intersection between such reflecting surface and the remaining two reflecting surfaces;

each of the said reflecting surfaces being of generally rectangular outline so as to respectively intercept one of the three said light beams, such that the boundaries of each beam so intercepted being generally co-extensive with the edges of that reflecting surface upon which such light beam impinges;

the reflecting surfaces of said unit being so related to the surface of said flight deck that the light beams respectively intercepted thereby will be caused to follow paths which diverge with respect to one another, each of such diverging paths forming a different angle, considered in a vertical plane, with the surface of said flight deck, and with each beam possessing a different chromatic characteristic, the intermediate one of said three beams possessing a particular characteristic which indicates to the pilot of said aircraft that he is approaching the said flight deck for a landing along the said predetermined flight path.

2. An optical device according to claim 1, further comprising:

means for stabilizing the said multiple-surfaces reflecting unit against a pitching motion of the carrier on which said unit is located, said stabilizing means including:

a mechanism having an output member the instantaneous position of which is a function of the orientation of the flight deck of said carrier with respect to a horizontal plane; and means connecting such output member to said multiple-surfaced reflecting unit so that variations in the position of such output member will result in a limited angular rotation of said reflecting unit about the axis upon which the said unit is mounted, thereby correspondingly changing the angle in said vertical plane made by each of the three reflecting light beams with respect to the surface of the said flight deck.

3. The combination of claim 1, in which the flght deck of said carrier has an opening therein located along the said centerline thereof:

a housing receivable in said opening, said housing having an upper portion which extends above the surface of said flight deck and is adapted to contain therewith the said multiple-surfaced reflecting unit, said unit being pivotably supported by said upper housing portions;

such upper housing portion having an apertured wall facing aft of said carrier and through which pass the light beams reflected by said unit, such light beams being of generally rectangular cross-section and respectively defining zones of illumination directed toward said aircraft when the latter is approaching said carrier for a landing on said flight deck.

References Cited by the Examiner

UNITED STATES PATENTS 3,003,451  10/1961  Lundin et al. _____ 114—43.5
3,138,779  6/1964   Murray et al. _____ 340—25
3,191,146  6/1965   Mitchell _____ 340—26

MILTON BUCHLER, *Primary Examiner.*

T. MAJOR, *Assistant Examiner.*